US012734805B2

(12) United States Patent
Oikawa et al.

(10) Patent No.: US 12,734,805 B2
(45) Date of Patent: Sep. 15, 2026

(54) PRINTING APPARATUS AND CONTROL METHOD FOR PRINTING APPARATUS

(71) Applicant: CANON KABUSHIKI KAISHA, Tokyo (JP)

(72) Inventors: Yuhei Oikawa, Kanagawa (JP); Jun Yasutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 18/435,063

(22) Filed: Feb. 7, 2024

(65) Prior Publication Data

US 2024/0278569 A1 Aug. 22, 2024

(30) Foreign Application Priority Data

Feb. 22, 2023 (JP) ................................ 2023-025980

(51) Int. Cl.
*B41J 2/145* (2006.01)
*B41J 25/304* (2006.01)
*B41J 29/12* (2006.01)

(52) U.S. Cl.
CPC ............. *B41J 2/145* (2013.01); *B41J 25/304* (2013.01); *B41J 29/12* (2013.01)

(58) Field of Classification Search
CPC ........... B41J 2/145; B41J 25/304; B41J 29/12
See application file for complete search history.

(56) References Cited

U.S. PATENT DOCUMENTS 8,079,659 B2 12/2011 Tajika
8,186,783 B2 5/2012 Yasutani
8,439,472 B2 5/2013 Yasutani
8,511,787 B2 8/2013 Yasutani
9,114,607 B2 8/2015 Ishii
10,766,251 B2 9/2020 Oikawa
10,836,155 B2 11/2020 Chikuma
10,875,297 B2 12/2020 Kano
11,097,535 B2 8/2021 Oikawa
11,192,357 B2 12/2021 Oikawa
11,298,937 B2 4/2022 Oikawa
11,351,774 B2 6/2022 Oikawa
11,691,415 B2 7/2023 Oikawa
11,820,136 B2 11/2023 Oikawa
(Continued)

FOREIGN PATENT DOCUMENTS

JP 2011-126131 A 6/2011

*Primary Examiner* — Jason S Uhlenhake
(74) *Attorney, Agent, or Firm* — Venable LLP

(57) ABSTRACT

A printing apparatus includes: a conveyance unit configured to convey a printing medium in a conveyance direction; a first printing head configured to eject a first liquid onto the printing medium conveyed by the conveyance unit in a state where a distance between a first ejection surface where ejection ports are formed and the printing medium corresponds to a first distance; and a plurality of second printing heads each configured to eject a second liquid, which reacts upon coming into contact with the first liquid, onto the printing medium conveyed by the conveyance unit in a state where a distance between a second ejection surface where ejection ports are formed and the printing medium corresponds to a second distance smaller than the first distance, wherein the first printing head is provided upstream of the plurality of second printing heads in the conveyance direction.

19 Claims, 14 Drawing Sheets

(56) References Cited

U.S. PATENT DOCUMENTS

| | | | | |
|---|---|---|---|---|
| 2002/0167576 | A1 | 11/2002 | Koitabashi | |
| 2003/0222939 | A1 * | 12/2003 | Gompertz | B41J 2/165<br>347/43 |
| 2004/0263602 | A1 * | 12/2004 | Nakashima | B41J 2/16585<br>347/104 |
| 2017/0341387 | A1 * | 11/2017 | Hamano | B41J 2/14209 |
| 2020/0101782 | A1 * | 4/2020 | Sekiguchi | B41J 11/0024 |

* cited by examiner

PRINTING APPARATUS AND CONTROL METHOD FOR PRINTING APPARATUS

BACKGROUND OF THE INVENTION

Field of the Invention

The present disclosure relates to a printing apparatus and a control method for the printing apparatus.

Description of the Related Art

In a printing apparatus, image formation is performed on a printing medium by conveying the printing medium to a printing head and ejecting ink droplets from ejection ports of the printing head toward the printing medium. As the printing medium is conveyed, the ink ejection surface of the printing head and the printing medium come close to each other up to about several millimeters away. For this reason, if a printing medium that has been deformed, such as with a folded corner, is conveyed, the deformed printing medium may come into contact with the ejection surface of the printing head. If they come into contact with each other, there is a possibility that trouble will occur.

Deformation of a printing medium is caused not only by individual differences in how users handle the printing medium (for example, how the printing medium is set in the feeding unit or how the printing medium is stored), but also occurs due to various factors such as the type or state of the printing medium used, or the installation environment of the printing apparatus. Therefore, deformation of a printing medium is an inevitable phenomenon.

In Japanese Patent Laid-Open No. 2011-126131 (hereinafter referred to as Document 1), there is described a technique in which a deformation amount detector that detects the deformation amount of a printing medium is arranged on the conveyance path of the printing medium, and in a case where deformation of the printing medium of a predetermined amount or more is detected, collision between the printing head and the printing medium is avoided by instantaneously raising the printing head.

The technique of Document 1 requires as many drive sources, such as powerful motors, as the number of printing heads to instantaneously toss the printing heads upward. Furthermore, since it is necessary to secure a conveyance distance corresponding to the time period from detecting the deformation of the printing medium by the deformation amount detector to retracting the printing heads upward, the size of the printing apparatus increases.

SUMMARY OF THE INVENTION

A printing apparatus according to the present disclosure includes: a conveyance unit configured to convey a printing medium in a conveyance direction; a first printing head configured to eject a first liquid onto the printing medium conveyed by the conveyance unit in a state where a distance between a first ejection surface where ejection ports are formed and the printing medium corresponds to a first distance; and a plurality of second printing heads each configured to eject a second liquid, which reacts upon coming into contact with the first liquid, onto the printing medium conveyed by the conveyance unit in a state where a distance between a second ejection surface where ejection ports are formed and the printing medium corresponds to a second distance smaller than the first distance, wherein the first printing head is provided upstream of the plurality of second printing heads in the conveyance direction.

Effect of the Invention

According to the present disclosure, contact between the printing medium and the ejection surface can be suppressed without increasing the cost and size of the printing apparatus.

Further features of the present invention will become apparent from the following description of exemplary embodiments with reference to the attached drawings.

DESCRIPTION OF THE EMBODIMENTS

Hereinafter, a detailed explanation is given of preferable embodiments of the present disclosure with reference to the accompanying drawings. The following embodiments are not intended to limit the contents of the present disclosure, and every combination of the characteristics explained in the following embodiments is not necessarily essential to the solution provided in the present disclosure. The same reference numbers are given to the same constituent elements.

First Embodiment

The present embodiment relates to an inkjet printing apparatus (hereinafter simply referred to as a printing apparatus). A part of the configurations explained below includes comparative examples for comparison with the configuration of the present embodiment. Details are described hereinafter.

<Configuration of the Printing Apparatus>

Figure 1:
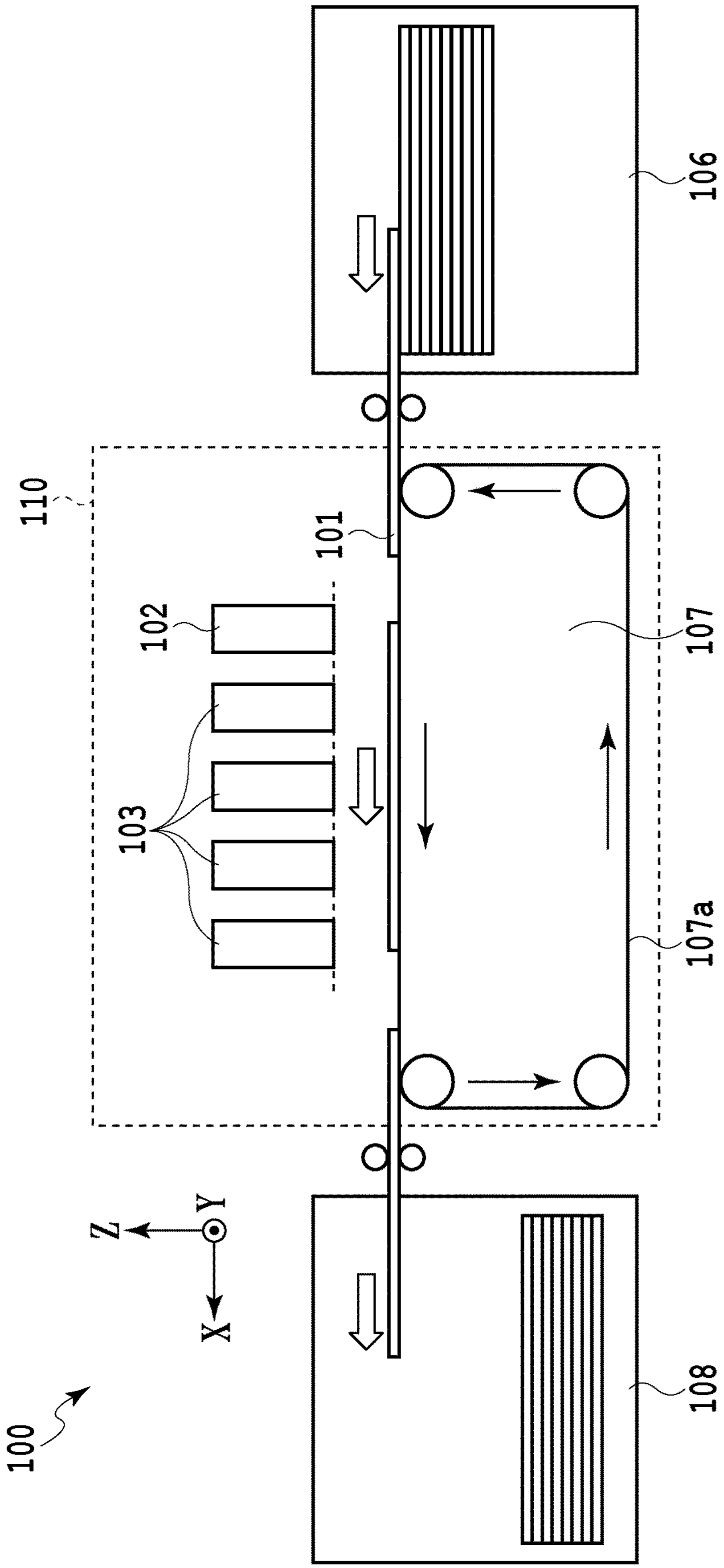
FIG. 1 is a schematic view illustrating an example (a comparative example) of the overall configuration of a printing apparatus.

FIG. 1 is a schematic view illustrating an example of the overall configuration of the printing apparatus 100. The printing apparatus 100 is a sheet-fed type printing apparatus that produces printed material by forming an ink image on the printing medium 101 using two types of liquids, i.e., a processing liquid and ink. In the present embodiment, the X direction, the Y direction, and the Z direction correspond to the width direction (the total length direction), the depth direction, and the height direction (the direction of gravitational force) of the printing apparatus 100, respectively. In the present embodiment, an explanation is given of the example in which the printing medium 101 is conveyed in the X direction, and thus the X direction also corresponds to the conveyance direction of the printing medium. Further, the Y direction also corresponds to the width direction of the sheet.

As illustrated in FIG. 1, the printing apparatus 100 includes the conveyance unit 107 which conveys the printing medium 101, the feeding unit 106 which feeds the printing medium 101 to the conveyance unit 107, and the discharge unit 108 which collects the printed printing medium 101 from the conveyance unit 107. Further, the printing apparatus 100 also includes the first printing head 102 which ejects the processing liquid that reacts with the ink onto the printing medium 101, and the second printing heads 103 which form an ink image by ejecting ink onto the printing medium 101 to which the processing liquid has been ejected. The present embodiment includes the one first printing head 102 and the four second printing heads 103. The first printing head 102 and the second printing heads 103 are also collectively and simply referred to as the printing heads. A unit not illustrated in the drawings which has a function such as drying or cooling may be added to the conveyance unit 107 at a given position depending on the system.

<Control System>

Figure 2:
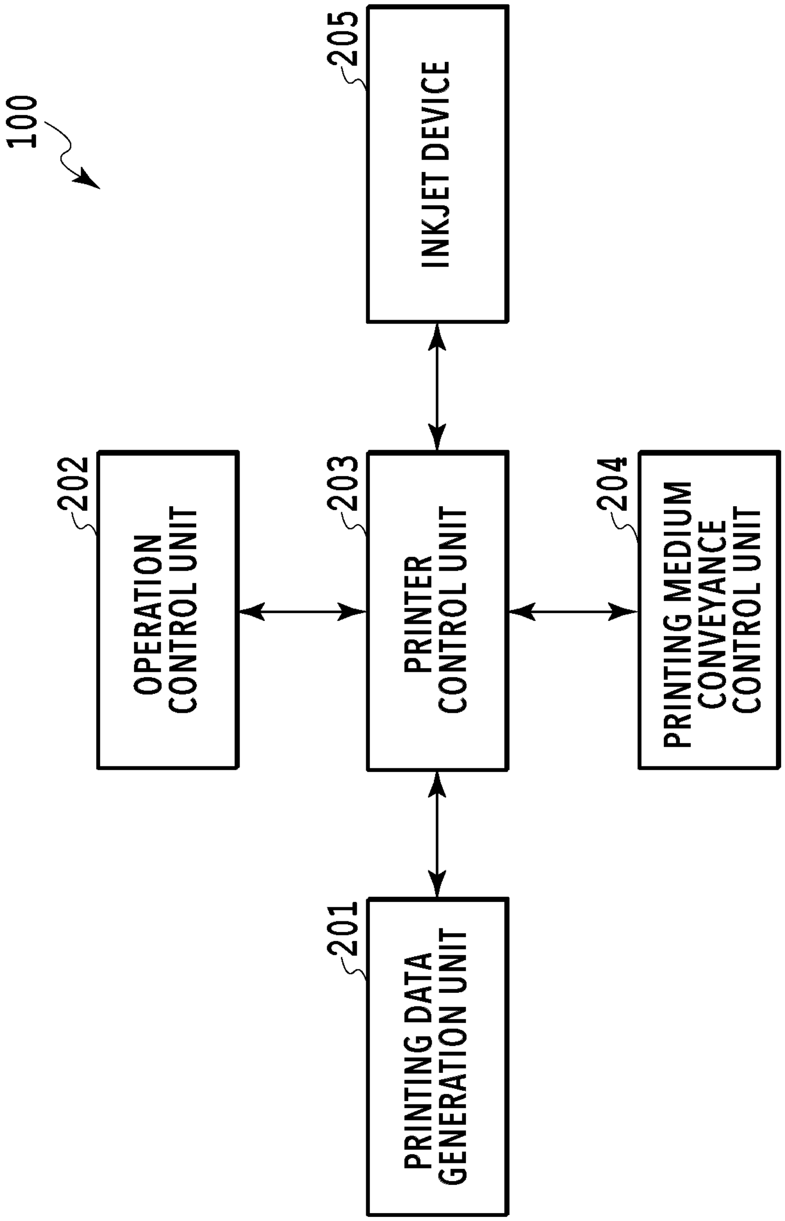
FIG. 2 is a block diagram illustrating an overview of a control system for the entire apparatus of the printing apparatus.

FIG. 2 is a block diagram illustrating an overview of the control system of the entire apparatus in the printing apparatus 100. The printing apparatus 100 includes the printing data generation unit 201, the operation control unit 202, the printer control unit 203, the printing medium conveyance control unit 204, and the inkjet device 205. The printing data generation unit 201 generates printing data and sends the generated printing data to the printer control unit 203. The printing data generation unit 201 may be configured with an external printing server or the like, or may be installed within the printing apparatus 100. The operation control unit 202 is an operation panel or the like, and accepts operation instructions. The printer control unit 203 is a printer control unit that implements a printing process. The printing medium conveyance control unit 204 is a printing medium conveyance control unit for conveying the printing medium. The inkjet device 205 is an inkjet device used for printing.

Figure 3:
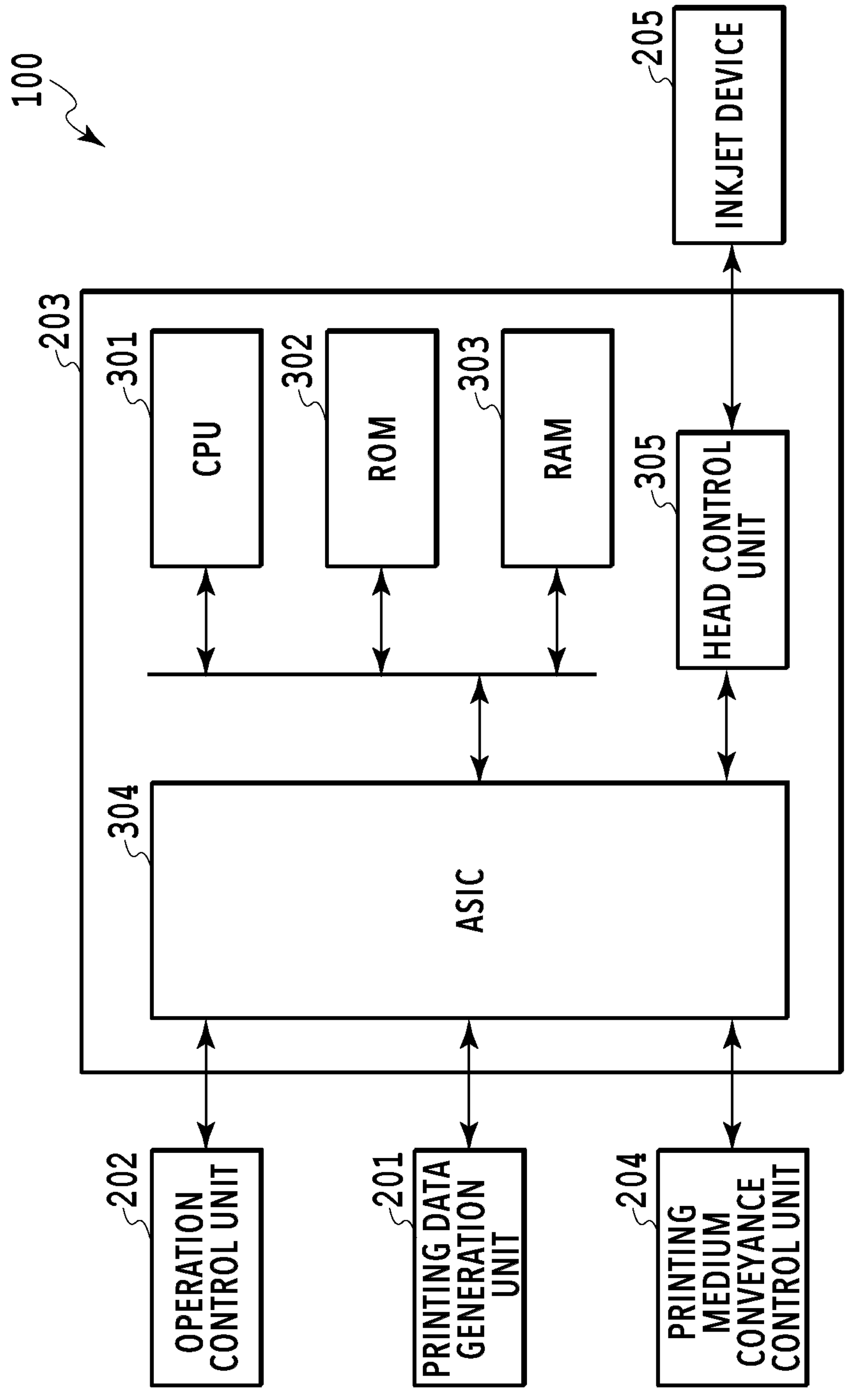
FIG. 3 is a block diagram illustrating details of a printer control unit.

FIG. 3 is a block diagram illustrating the printer control unit 203 in detail. In FIG. 3, the other configurations illustrated in FIG. 2 are also included. The printer control unit 203 includes the CPU 301, the ROM 302, the RAM 303, the ASIC 304, and the head control unit 305. The CPU 301 controls the entire printing apparatus 100. The ROM 302 stores a control program of the CPU 301. The RAM 303 is used for temporarily storing data, executing a program, and the like. The ASIC 304 is an integrated circuit for specific applications with a built-in network controller, serial IF controller, head data generation controller, motor controller, etc. The head control unit 305 generates the ejection data used in the inkjet device 205, generates the driving voltage, and the like.

<Conveyance Unit>

Returning to FIG. 1, an explanation is herein given of the conveyance unit 107 in the printing unit 110. In the printing unit 110, the first printing head 102 and the second printing heads 103 eject liquid from above in the direction of gravitational force onto the printing medium 101 conveyed. By this ejection operation, the printing processing is performed and an image is formed. In the conveyance unit 107 in the printing unit 110, the conveyor belt 107*a* is horizontally arranged so that the conveyance behavior of the printing medium directly below the first printing head 102 and the second printing heads 103 is stabilized. The printing medium 101 sent from the feeding unit 106 is conveyed while being suctioned in the −Z direction by the conveyor belt 107*a*.

The type of printing medium 101 is not particularly limited, and any given known printing medium 101 may be used. As the printing medium 101, in addition to a single sheet cut into a predetermined size, a long sheet wound into a roll or the like can be used. As the material of the printing medium 101, paper, a plastic film, wooden board, cardboard, metal film, or the like can be used.

The printing medium 101 is conveyed in the conveyance direction (the X direction) by the conveyance unit 107. The conveyor belt 107*a* is a belt that rotates around the rotating shafts extending in the depth direction (the Y direction) which intersects the conveyance direction, and is made of a material such as resin or metal. The conveyor belt 107*a* is a suction conveyor belt configured to be able to adsorb and fix the printing medium 101 through a large number of holes formed in the belt by a suction pump or a suction fan provided inside the belt. The present embodiment is not limited to fixing the printing medium 101 by suctioning. Adsorption by static electricity or the like may be used, and the fixed conveyance method of the printing medium 101 can be selected as appropriate depending on the system.

The arrows inside the conveyance unit 107 in FIG. 1 indicate the rotation direction of the conveyor belt 107*a*, and the arrows outside the conveyance unit 107 in FIG. 1 indicate the conveyance path of the printing medium 101. The printing medium 101 is conveyed from the feeding unit 106 to the conveyance unit 107. An ink image is formed on the printing medium 101 on the conveyance unit 107 by the first printing head 102 that ejects the processing liquid and the second printing heads 103 that eject ink. The printing medium 101 on which the ink image is formed is conveyed from the conveyance unit 107 to the discharge unit 108, and the printing medium 101 is stacked in the discharge unit 108.

<Printing Heads>

The printing heads are herein explained using FIG. 1. The first printing head 102 and the second printing heads 103 in FIG. 1 are illustrated as a comparative example. Specifically, the positions in the height direction (the direction of gravitational force) are different from those of the printing heads in the present embodiment. The rest of the configuration is the same as that of the printing heads in the present embodiment, and thus for ease of understanding, the printing heads in the comparative example are explained first.

The first printing head 102 and the second printing heads 103 are full-line heads extending in the sheet width direction (the Y direction). The first printing head 102 and the second printing heads 103 each have the ejection ports 404 (see FIG. 5A to FIG. 5C described later) arrayed in a range that covers the width of the image printing area of the printing medium 101 of the maximum size usable. The lower surfaces of the first printing head 102 and the second printing heads 103 in the direction of gravitational force (on the printing medium 101 side) include the ejection surfaces where the ejection ports open. The ejection surfaces of the first printing head 102 and the second printing heads 103 are fixed opposing the printing medium 101 conveyed (opposing the conveyance unit 107) in a state maintaining a small gap (about several millimeters) from the front surface of the printing medium 101 conveyed. The position of the printing heads at this time is referred to as the printing position. The comparative example and the present embodiment differ in the positions of the ejection surfaces of the printing heads in the printing position. Details are described hereinafter.

As illustrated in FIG. 1, multiple printing heads are lined up along the conveyance direction (the X direction) as the printing heads. In the present example, the first printing head 102 that ejects the processing liquid is arranged on the upstream side in the conveyance direction. The four second printing heads 103 are arranged in order on the downstream side of the first printing head 102 in the conveyance direction. The four second printing heads 103 correspond to line type printing heads of four colors, i.e., Bk (black), Y (yellow), M (magenta), and C (cyan). The types of colors, the order of the colors, and the number of colors are not limited to this example. Each liquid used in the printing heads is supplied from an ink tank, which is not illustrated in the drawings, to the first printing head 102 and the second printing heads 103 via ink tubes, respectively.

Figure 4:
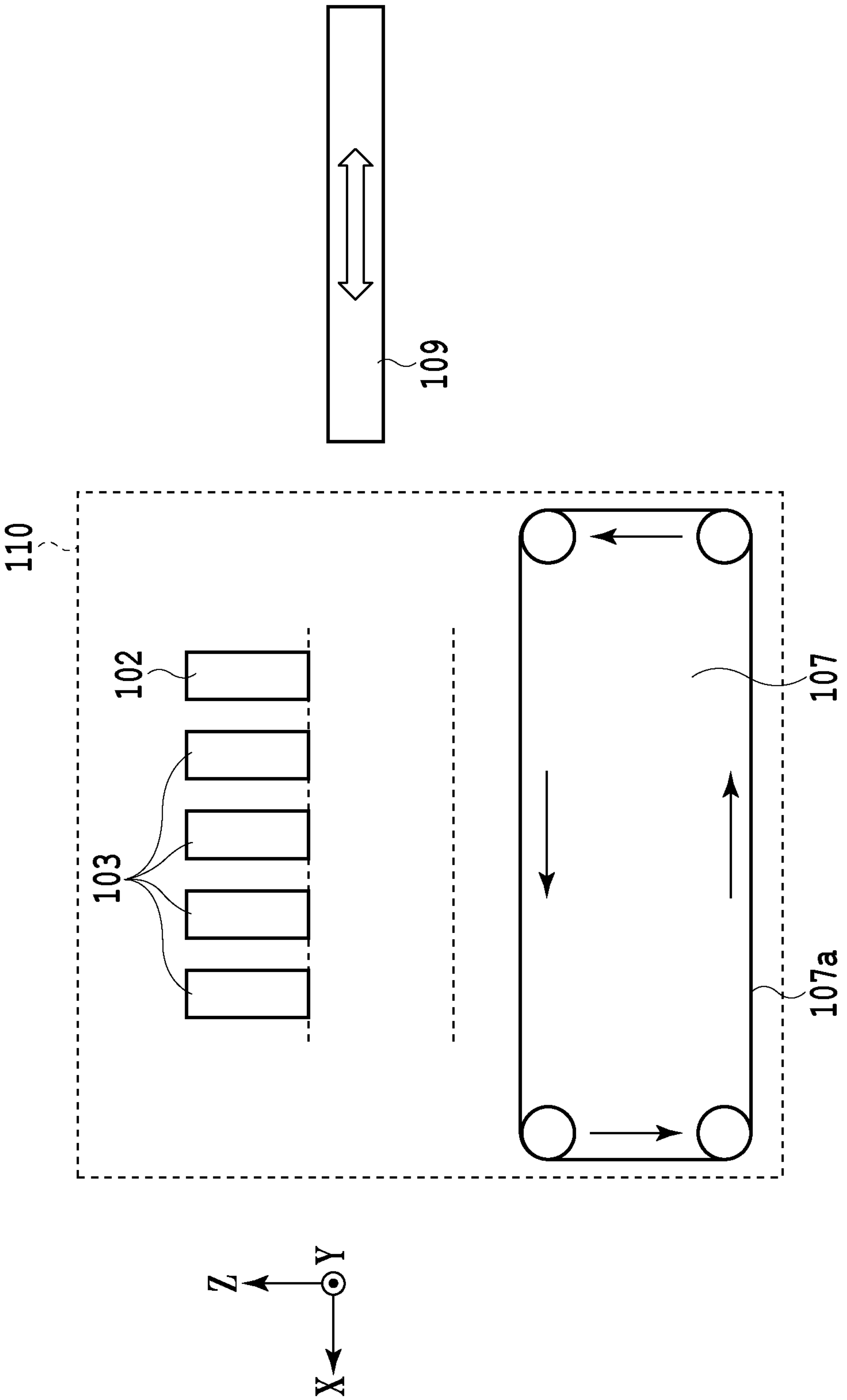
FIG. 4 is a schematic view of a printing unit illustrating a state in which printing heads are in a standby position.

FIG. 4 is a schematic view of the printing unit 110 illustrating a state in which the printing heads are in the standby position. The standby position is equivalent to the standby position of the printing heads in a case where no printing operation is being performed. The first printing head 102 and the second printing heads 103 in the standby position stand by at the positions retracted upward in the direction of gravitational force as compared with the printing position.

The first printing head 102 and the second printing heads 103 can move to a maintenance position that is neither the standby position nor the printing position. The maintenance unit 109 is configured to be able to move below the first printing head 102 and the second printing heads 103 in the standby position with respect to the direction of gravitational force. The maintenance position is a position where the first printing head 102 and the second printing heads 103 are in a state moved downward in the direction of gravitational force from the standby position so as to abut on the maintenance unit 109 that has been moved. For example, in a case of capping the ejection surfaces of the first printing head 102 and the second printing heads 103 after printing is completed, the first printing head 102 and the second printing heads 103 move to the maintenance position. Alternatively, in such a case where dust or the like adheres to the ejection surfaces of the first printing head 102 and the second printing heads 103, causing liquid ejection failure, the first printing head 102 and the second printing heads 103 move to the maintenance position.

By moving the first printing head 102 and the second printing heads 103 to the standby position, a space is formed between the first printing head 102 and second printing heads 103 and the conveyance unit 107. Therefore, the maintenance unit 109, which is movable in the conveyance direction (the X direction), can be moved to a position opposing the printing heads. At the maintenance position, maintenance (also referred to as a recovery operation) of the ejection surfaces is performed.

The maintenance unit 109 is equipped with multiple cap units (not illustrated in the drawings) and wiper units (not illustrated in the drawings) corresponding to the first printing head 102 and the second printing heads 103. The cap units can suppress drying of the ejection ports by sealing (capping) the ejection surfaces of the first printing head 102 and the second printing heads 103. The wiper units can maintain the ejection surfaces in a normal state by periodically wiping away dust or droplets adhering to the ejection surfaces with their wiper members.

<Ejection Surfaces>

Figure 5A:
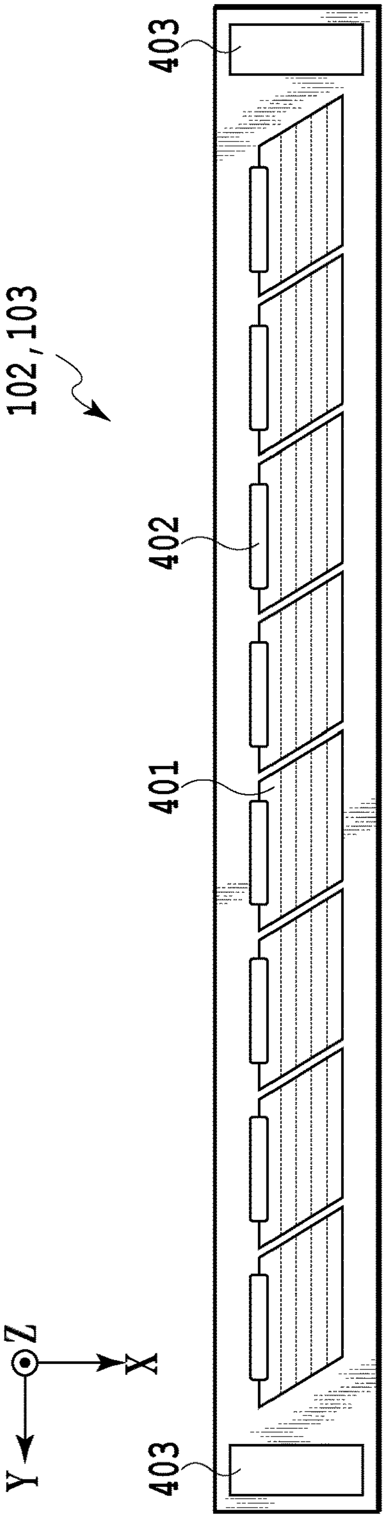
FIG. 5A to FIG. 5C are diagrams for explaining ejection surfaces of a first printing head and second printing heads.
Figure 5C:
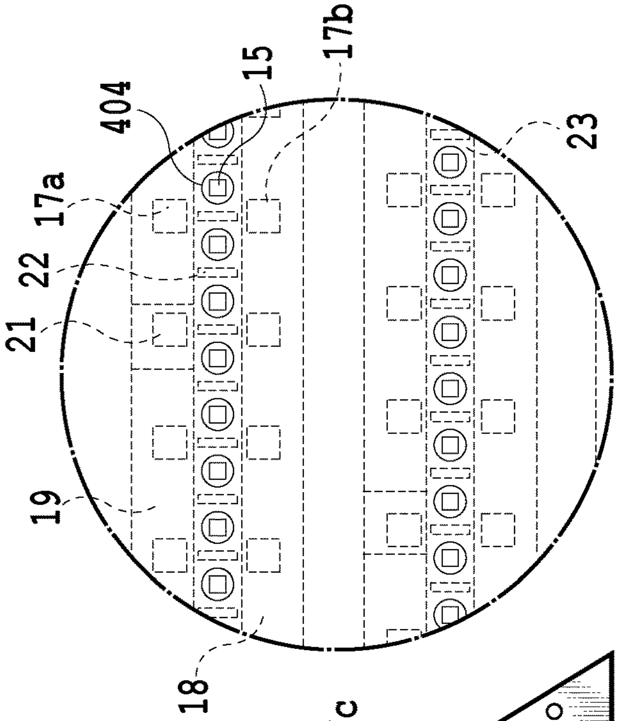
Figure 5B:
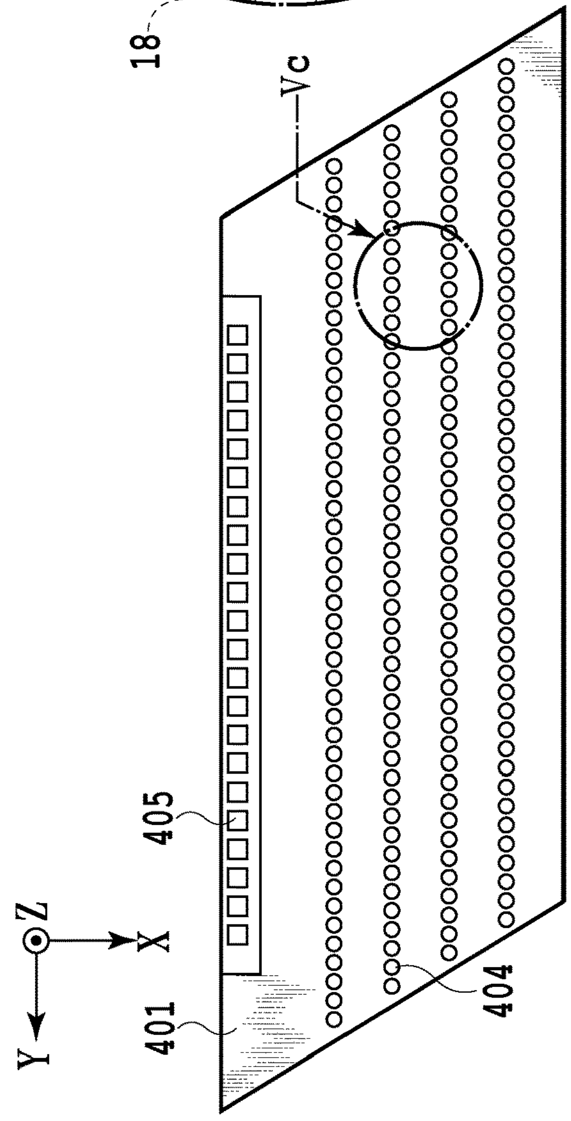

FIG. 5A to FIG. 5C are diagrams for explaining the ejection surfaces of the first printing head 102 and the second printing heads 103. FIG. 5A is a plan view illustrating the ejection surfaces of the first printing head 102 and the second printing heads 103. FIG. 5A is a diagram of the first printing head 102 and the second printing heads 103 seen from the −Z direction. In the present embodiment, although an explanation is given of the example in which the ejection surfaces of the first printing head 102 and the second printing heads 103 have the same configuration, the ejection surfaces of the first printing head 102 and the second printing heads 103 may have different configurations. Hereinafter, an explanation is given on the premise that the ejection surface illustrated in FIG. 5A to FIG. 5C is the ejection surface of the first printing head 102. As illustrated in FIG. 5A, the first printing head 102 has the multiple printing element substrates 401, which are equipped with the multiple ejection ports 404 (FIG. 5B) that eject liquid, arranged in an array in the sheet width direction (the Y direction). Further, the positioning members 403 for the first printing head 102 are arranged at both ends of the array of printing element substrates 401. The positioning members 403 are configured to be able to abut on a member for positioning the printing head (not illustrated in the drawings) arranged on the opposing conveyance unit side. The distance between the ejection surface of the first printing head 102 and the conveyor belt 107*a* can be regulated by the positioning members 403 and the member for positioning the printing head (not illustrated in the drawings) abutting on each other. Further, by adjusting the height of the member for positioning the printing head (not illustrated in the drawings), it is possible to adjust the distance between the ejection surface of the first printing head 102 and the conveyor belt 107*a* to a desired distance.

FIG. 5B is a schematic view of the printing element substrate 401 seen from the −Z direction. Here, the surface on which the ejection ports 404 are arranged is described as the upper surface. FIG. 5C is a partially enlarged view of FIG. 5B. The front surfaces (the ejection surfaces) of the printing element substrates 401 are configured of resin. The multiple ejection ports 404 for ejecting liquid are arranged so as to form rows on the printing element substrates 401. The multiple ejection ports 404 are arrayed along the orthogonal direction (the Y direction) relative to the conveyance direction (the X direction) of the printing medium 101. The configuration in which the multiple ejection ports 404 are lined up in the Y direction is referred to as an ejection port array. As illustrated in FIG. 5B, the printing element substrate 401 has multiple ejection port arrays arrayed in the X direction. Specifically, four rows of ejection port arrays, each of which has 512 ejection ports arrayed at 600 dpi (dots/inch), are arranged in the X direction. Further, two rows of ejection port arrays adjacent in the X direction are arranged with a 1200 dpi shift in the Y direction. As illustrated in FIG. 5C, the pressure chamber 23 is arranged for each ejection port 404 below the resin unit in which the ejection port array is formed. By controlling the pressure in the pressure chamber 23, ink can be ejected from any given ejection port 404.

The printing element substrates 401 are configured by laminating a silicon substrate formed of silicon and an ejection port forming member formed of photosensitive resin. As illustrated in FIG. 5C, the printing element 15 is formed on one face of the silicon substrate, and a groove constituting the liquid supply path 18 and liquid collection path 19 extending along the ejection port array is formed on the reverse face. A pressure difference is generated between the liquid supply path 18 and the liquid collection path 19 by a circulation mechanism which is not illustrated in the drawings. While printing is performed by ejecting liquid from the multiple ejection ports 404, a flow of the liquid is generated by this pressure difference even in the ejection ports 404 that are not performing the ejection operation. That is, the liquid in the liquid supply path 18 arranged in the silicon substrate flows to the liquid collection path 19 via the supply ports 17*a*, the pressure chambers 23, and the collection ports 17*b*. Due to this flow, thickening of the liquid can be suppressed even in the ejection ports 404 and the pressure chambers 23 where liquid ejection is paused. In addition, this flow allows the thickened ink generated by evaporation from the ejection ports 404, as well as bubbles, foreign substances, and the like to be collected into the liquid collection path 19. In this way, in the printing head of the present embodiment, it is possible to suppress thickening of the liquid in the vicinity of the pressure chambers 23 and the ejection ports 404, which makes it possible to suppress ejection position error and non-ejection, and as a result, it is possible to perform high-quality printing.

The printing element substrates 401 are electrically connected to the printing apparatus main unit side via the terminals 405. Between the printing element substrates 401 and the printing apparatus main unit side, communication using signals is performed with the printing heads. The terminals 405 are protected by the sealing material 402 so as not to come into contact with the liquid.

As the inkjet system, any given system such as a system using heating elements, a system using piezoelectric elements, a system using electrostatic elements, or a system using MEMS elements may be employed.

<Processing Liquid>

The printing unit 110 of the present embodiment has the first printing head 102 that ejects a processing liquid onto the printing medium 101. The processing liquid is a processing liquid that insolubilizes the ink as the processing liquid comes into contact with the ink. That is, the processing liquid can reduce the fluidity of at least a part of the ink and the ink composition on the printing medium 101 by coming into contact with the ink ejected by the second printing heads 103. Therefore, bleeding and beading during the image-forming period using ink can be suppressed. Bleeding is a phenomenon in which adjacently ejected inks mix with each other. Beading is a phenomenon in which ink that landed first is drawn to ink that landed later. Specifically, by contacting, a reactive agent (also referred to as an ink viscosity increasing component) contained in the processing liquid chemically reacts with or physically adsorbs a coloring material, resin, or the like that is a part of the composition constituting the ink. This causes an increase in the viscosity of the entire ink and a local increase in viscosity due to aggregation of a part of the components constituting the ink, such as a coloring material. As a result, the fluidity of at least a part of the ink and the ink composition can be reduced.

By utilizing this phenomenon, ejecting the processing liquid onto the printing medium 101 before ejecting ink can suppress bleeding and beading during image printing using the inkjet system.

<Trouble with the Ejection Surfaces Due to Contact with the Printing Medium>

In the printing apparatus using the above-described processing liquid, the processing liquid has the function of aggregating and thickening the ink, and thus has the effect of improving the image quality of the product on the printing medium 101. On the other hand, if a reaction that causes the ink to aggregate or thicken unintentionally occurs on an ejection surface of the first printing head 102, firm reactants may inhibit the ejection of droplets from the ejection ports 404, which may deteriorate the image quality on the contrary.

Figure 6:
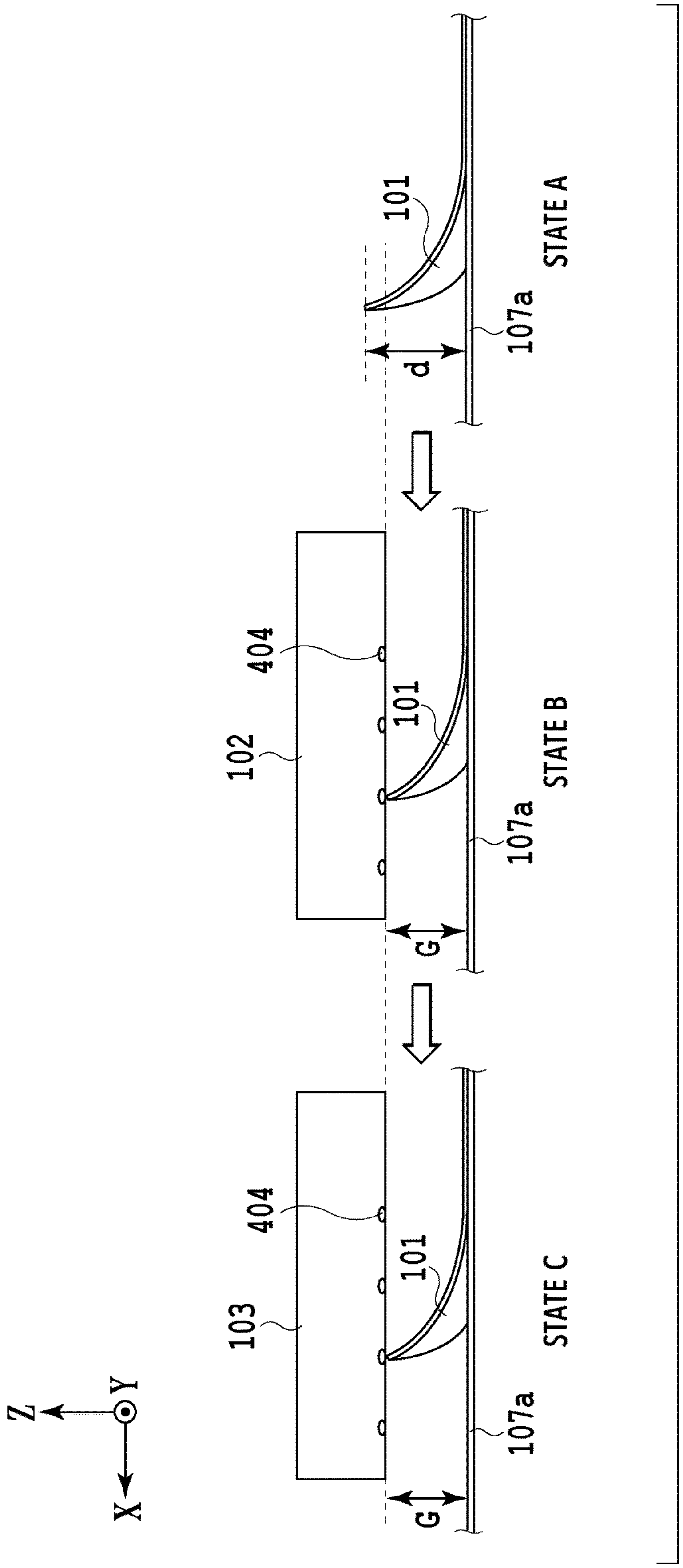
FIG. 6 is a diagram for explaining a situation in which ink aggregates or thickens on an ejection surface.

FIG. 6 is a diagram for explaining a situation in which ink aggregates or thickens on an ejection surface. An explanation is herein given with reference to FIG. 6 of a situation in which ink unintentionally aggregates and thickens on an ejection surface due to the processing liquid. An explanation is herein given with the example of how the deformed printing medium 101 passes below the first printing head 102 and the second printing heads 103. Further, FIG. 6 is a diagram of a comparative example in which the positions of the first printing head 102 and the second printing heads 103 in the height direction are the same as explained in FIG. 1.

FIG. 6 is a diagram illustrating how the printing medium 101 is conveyed below the printing heads. In FIG. 6, the positions of the first printing head 102 and the second printing heads 103 are fixed, and it is illustrated how the printing medium 101 is sequentially conveyed by the conveyance unit 107 as in state A, state B, and state C. The front surface of the printing medium 101 conveyed by the conveyor belt 107*a* is held by the conveyance unit 107 so as to be in a state maintaining the distance G (about several millimeters), which is a small gap, to the ejection surfaces of the first printing head 102 and the second printing heads 103 where the ejection ports 404 open. As described above, since the conveyed printing medium 101 is adsorbed to the conveyor belt 107*a*, in a normal case, the ejection surfaces of the first printing head 102 and second printing heads 103 and the opposing printing medium 101 are kept at the predetermined distance.

There are situations in which this distance varies depending on the state of the printing medium 101. For example, as in state A in FIG. 6, there are cases where the printing medium 101 is conveyed by the conveyance unit 107 in a deformed state, such as a state being folded or bent. This is because, for example, as the user using the printing apparatus 100 sets the printing medium 101 in the feeding unit 106, the user may set the printing medium 101 with the corner or the like of the printing medium 101 in a folded or bent state. Even if the conveyance accuracy of the printing medium 101 in the conveyance unit 107 is improved, there are individual differences in how users handle the printing medium 101. Therefore, it is difficult to eliminate the possibility that the printing medium 101 will be deformed. Further, deformation of the printing medium 101 occurs not only due to individual differences in how users handle the printing medium 101, but also due to various factors such as the type or state of the printing medium 101 used as well as the installation environment of the printing apparatus 100, and thus deformation is an inevitable phenomenon. In FIG. 6, the deformation amount of the printing medium is indicated as d.

If the printing medium 101 is conveyed by the conveyance unit 107 in this state, the distance between the printing medium 101 and the ejection surfaces becomes locally shortened. As illustrated in state B and state C, in a case where the deformation amount d is greater than the distance G between the printing medium 101 and the ejection surfaces (G<d), the printing medium 101 comes into contact with the ejection surfaces of each of the first printing head 102 and the second printing heads 103. The ejection surface of the first printing head 102 is referred to as the first ejection surface, and the ejection surfaces of the second printing heads 103 are referred to as the second ejection surfaces.

In state B, onto the contact surface of the printing medium 101 that has made contact with the ejection surface of the first printing head 102 that ejects the processing liquid, the processing liquid drawn out from the ejection ports 404 of the first printing head 102 has been transferred at the time of contact. In this state as such, the printing medium 101 is conveyed by the conveyor belt 107*a*, and as illustrated in state C, the printing medium 101 comes into contact again with the second printing head 103 arranged downstream of the conveyance. At this time, the processing liquid has been transferred to the contact surface of the printing medium 101 since state B. Therefore, the ink components from the ejection ports 404 of the second printing head 103 arranged in the contact area with which the printing medium 101 comes into contact react with the components of the processing liquid transferred to the contact area of the printing medium 101, and thus aggregation and thickening of the ink occurs on the ejection surface. The aggregation and thickening of the ink occurring at the ejection ports 404 arranged in the contact area and in the vicinity thereof inhibit ejection of the ink, and as a result, non-ejection and ejection failure of the second printing head 103 are incurred. In this way, if contact occurs between a deformed printing medium and an ejection surface of the printing heads, depending on the type of liquid to be ejected, liquid aggregation or thickening may occur in the contact area, and as a result, non-ejection, ejection failure, or the like is incurred.

Figure 7:
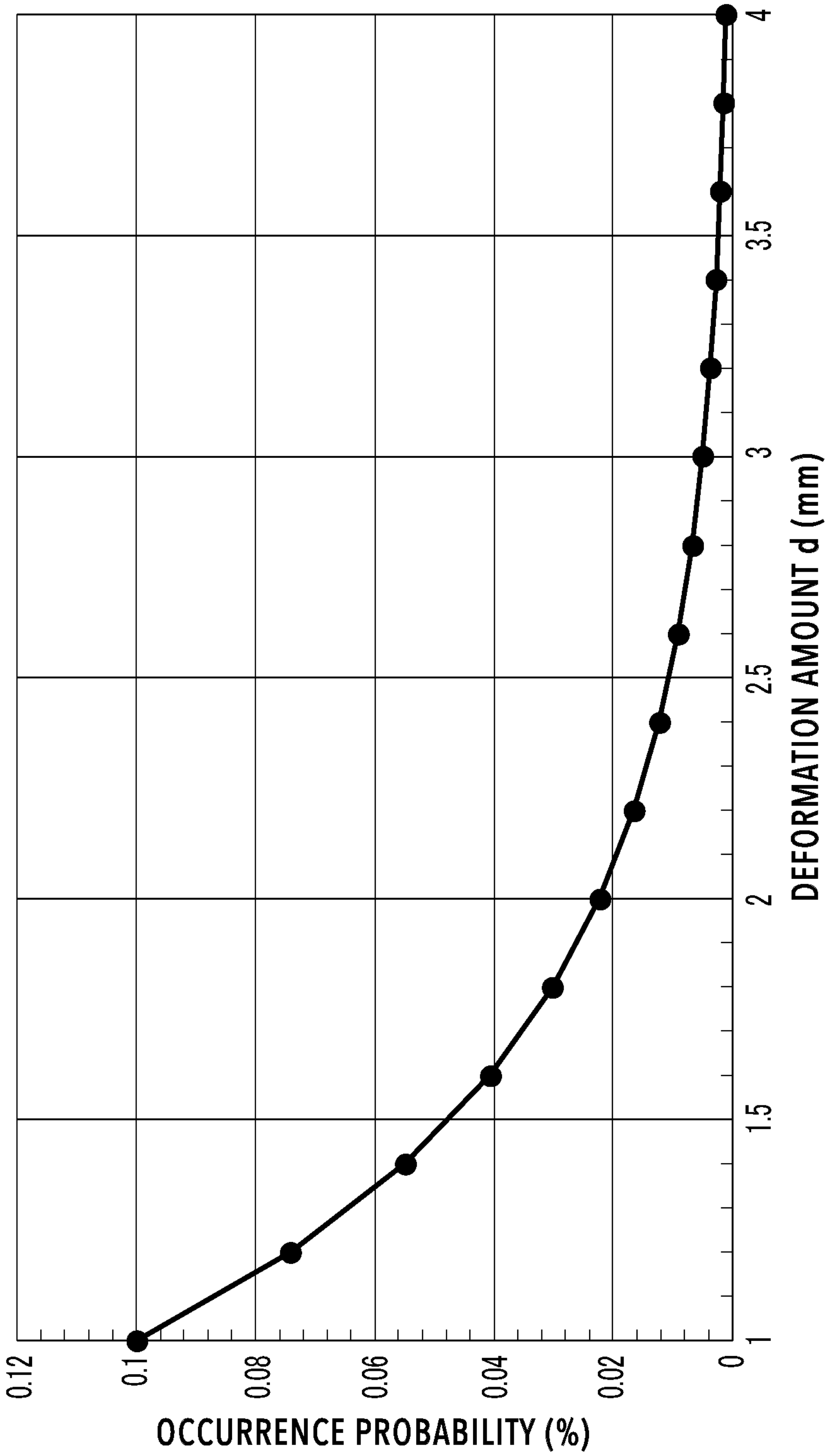
FIG. 7 is a diagram illustrating the deformation amount of a printing medium and its occurrence probability.

FIG. 7 is a diagram illustrating the deformation amount d of a printing medium and its occurrence probability. The graph illustrated in FIG. 7 illustrates the results obtained by analyzing the sheet deformation amount during a conveyance operation of a printing medium over a predetermined period regarding a current model actually used on the market. FIG. 7 illustrates the probability that a printing medium with the deformation amount d or more is conveyed, in a range where the deformation amount d of the printing medium is greater than 1.0 mm. For example, according to FIG. 7, it can be seen that the occurrence probability for the total number of sheets passed is 0.074% for deformation of about 1.2 mm and 0.017% for deformation of about 2.2 mm. As illustrated in FIG. 7, it can be seen that, statistically, the greater the deformation amount d is, the lower the probability of occurrence becomes.

<Configuration of the Present Embodiment>

In the above description, the overall configuration of the printing apparatus 100 including the comparative example as well as problems that may occur in such a configuration is explained. Hereinafter, the configuration of the present embodiment, particularly the positions of the ejection surfaces of the printing heads in the height direction (the direction of gravitational force), is explained.

Figure 8:
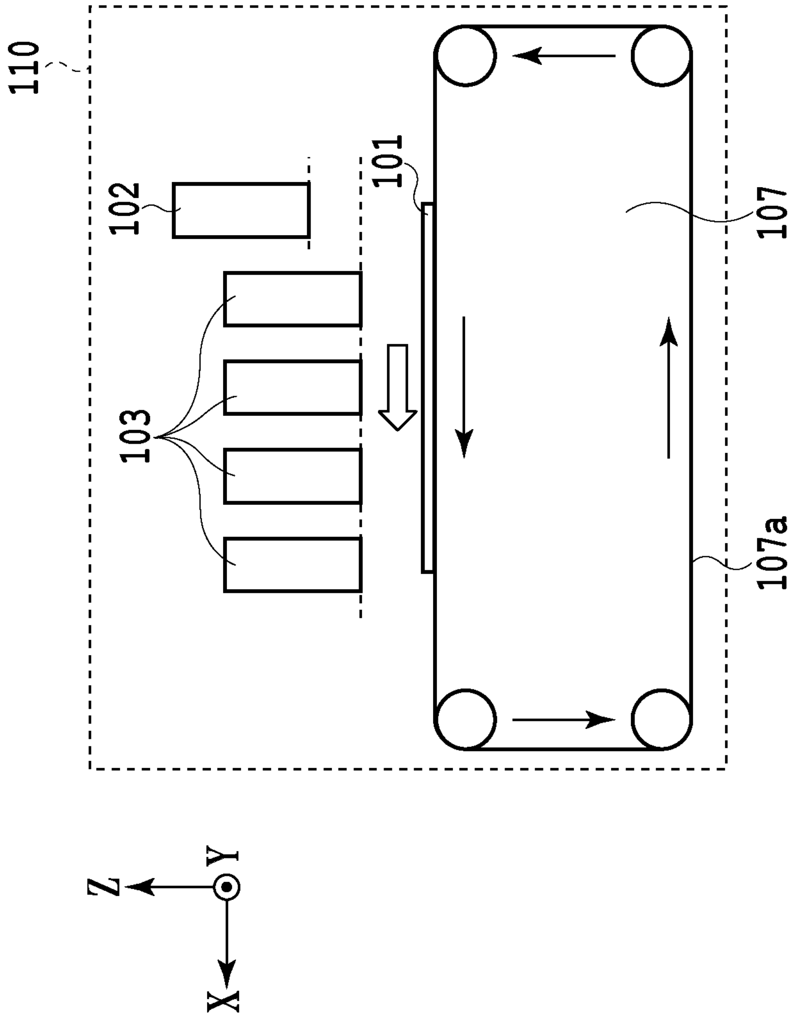
FIG. 8 is a diagram illustrating a configuration of a printing apparatus according to the first embodiment.

FIG. 8 is a diagram illustrating the configuration of the printing apparatus 100 in the present embodiment. FIG. 8 illustrates the configuration of the printing unit 110 in the present embodiment taken out of the configuration explained in FIG. 1. In the present embodiment, an explanation is herein given of the configuration for suppressing non-ejection or ejection failure caused by ink aggregation or thickening on an ejection surface due to contact with the printing medium 101 as explained in FIG. 6. Since the configuration other than the printing unit 110 is the same as the example explained in FIG. 1, the explanation thereof is omitted here. FIG. 8 illustrates the positions of the first printing head 102 and the second printing heads 103 in the printing position.

In the present embodiment, each printing head is arranged so that the distance between the ejection surface of the first printing head 102 that ejects the processing liquid and the conveyor belt 107*a* is larger than the distances between the ejection surfaces of the second printing heads 103 that eject ink and the conveyor belt 107*a*. This makes it possible to significantly reduce the possibility that the printing medium 101 that has come into contact with the first printing head 102 comes into contact with the ejection surfaces of the second printing heads 103. Therefore, as a result, it is possible to suppress the ink from aggregating or solidifying on the ejection surfaces of the second printing heads 103. Here, although the explanation has been given with the distances between the ejection surfaces and the conveyor belt 107*a*, the distances may be the distances between the ejection surfaces and the front surface of the printing medium 101. That is, it is also possible that each printing head is arranged so that the distance between the ejection surface of the first printing head 102 and the front surface of the printing medium 101 is larger than the distances between the ejection surfaces of the second printing heads 103 and the front surface of the printing medium 101.

This configuration is made based on an observation that the landing accuracy of the processing liquid ejected by the first printing head 102 does not need to be as high as that of the ink ejected by the second printing heads 103. That is, unlike other inks, the processing liquid does not directly form pixels. For this reason, it is not always necessary to make the processing liquid land exactly where it should land on the printing medium 101. In other words, the landing accuracy may be such that the processing liquid ejected toward the printing medium 101 blends with ink on the printing medium 101 and causes the desired aggregation or thickening. From this point of view, it is preferable to configure the surface tension of the processing liquid lower than the surface tension of the other inks so that the processing liquid can more easily spread on the printing medium. If the processing liquid can spread on the sheet surface and blend with the ink, the effect on image quality can be reduced even if the landing accuracy of the processing liquid is not very high.

Figure 9:
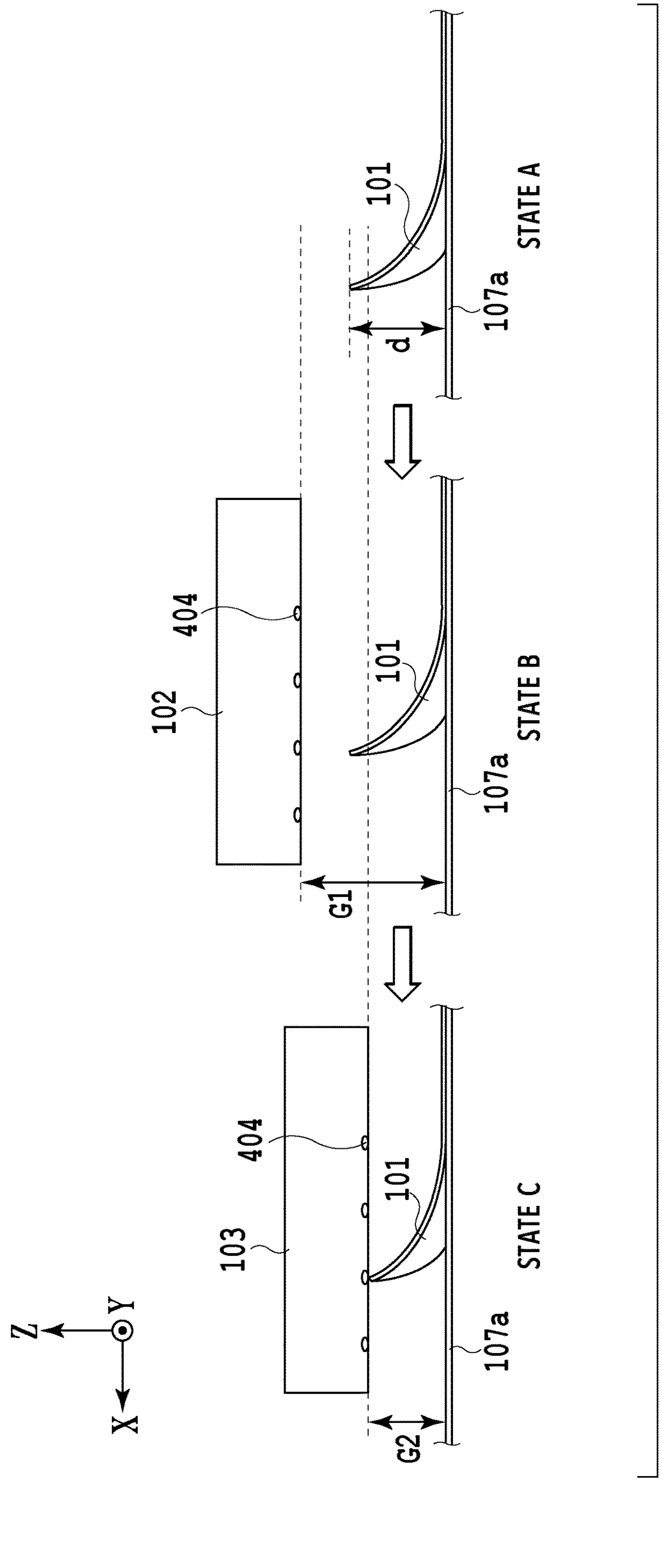
FIG. 9 is a diagram illustrating how the printing medium is conveyed below the printing heads according to the first embodiment.

FIG. 9 is a diagram illustrating how the printing medium 101 is conveyed below the printing heads. Using FIG. 9, an explanation is herein given of a situation in which the deformed printing medium 101 passes below the first printing head 102 and the second printing heads 103. The front surface of the printing medium 101 conveyed by the conveyor belt 107*a* is held on the conveyor belt 107*a* so as to be in a state maintaining a distance, which is a small gap, to the ejection surfaces of the first printing head 102 and the second printing heads 103 where the ejection ports 404 open. More specifically, the front surface of the printing medium 101 is held on the conveyor belt 107*a* so as to be in a state maintaining the distance G1 (about several millimeters) to the first printing head 102, and in a state maintaining the distance G2 (about several millimeters) to the second printing head 103. In the present embodiment, as explained in FIG. 8, the distance G1 is configured to be larger than the distance G2. As an example, the distance G1 is 2.0 mm and the distance G2 is 1.0 mm.

The distances between the ejection surfaces of the first printing head 102 and the second printing head 103 and the front surface of the printing medium 101 (or the conveyor belt 107*a*) can be regulated by adjusting the height of the member for positioning the printing head (not illustrated in the drawings) that abuts on the positioning member 403.

In FIG. 9, state A illustrates how the deformed printing medium 101 is conveyed. Here, a situation where the corner of the printing medium 101 is curled and is lifted by the distance d from the conveyor belt 107*a* is illustrated. In the present example, the distance d is 1.2 mm. According to FIG. 7, the occurrence probability of a printing medium deformed by 1.2 mm being conveyed is about 0.074% of the total number of sheets conveyed.

State B in FIG. 9 illustrates how the deformed printing medium 101 is conveyed below the first printing head 102. The relationship between the distance G1 between the ejection surface of the first printing head 102 and the front surface of the printing medium 101 and the deformation amount d of the printing medium 101 is G1>d. Therefore, the deformed printing medium 101 does not come into contact with the ejection surface of the first printing head 102.

State C in FIG. 9 illustrates how the deformed printing medium 101 is conveyed below the second printing head 103. The relationship between the distance G2 between the ejection surface of the second printing head 103 and the front surface of the printing medium 101 and the deformation amount d of the printing medium is G2<d. Therefore, the deformed printing medium 101 comes into contact with the ejection surface of the second printing head 103. However, since contact between the deformed printing medium 101 and the ejection surface of the first printing head 102 has been avoided, the ink does not aggregate or thicken on the ejection surface of the second printing head 103.

As explained above, according to the present embodiment, it is possible to suppress the occurrence of trouble caused by contact between a printing medium and an ejection surface without increasing the cost and size of the printing apparatus. That is, in the present embodiment, the distance between the first printing head 102 that ejects the processing liquid and the conveyor belt 107*a* is arranged so as to be larger than the distance between the second printing head 103 that ejects ink and the conveyor belt 107*a*. This makes it possible to significantly reduce the probability that the deformed printing medium will come into contact with the ejection surfaces of both the first printing head 102 and the second printing head 103 within a predetermined range of deformation amount of the printing medium 101. According to FIG. 7, in the present embodiment, the probability that a deformation amount that causes contact with both the first printing head 102 and the second printing head 103 will occur in the printing medium is 0.025%. On the other hand, the occurrence probability in a case where the configuration of the present embodiment is not adopted (that is, in a case such as the comparative example illustrated in FIG. 1) is 0.074%. Therefore, according to the present embodiment, it is possible to significantly suppress the risk of aggregation or thickening due to the processing liquid on the ejection surface of the second printing head 103.

In this way, according to the present embodiment, for example, as printing is performed using the processing liquid to realize a favorable image quality even on a poorly absorbable printing medium, the possibility that non-ejection or ejection failure of the ink occurs due to a reaction of the processing liquid and the ink can be reduced.

In the example of FIG. 9, one second printing head 103 and the first printing head 102 are illustrated. As described above, the printing apparatus 100 of the present embodiment is equipped with the four second printing heads 103. In the present embodiment, it is sufficient as long as the height of the ejection surface of the first printing head 102 is arranged so as to be higher than any of the ejection surfaces of the other second printing heads 103. Therefore, the heights of the ejection surfaces among the plurality of second printing heads 103 may be the same, or may be different heights within a range lower than the ejection surface of the first printing head 102.

Second Embodiment

In the first embodiment, the explanation is given of the example in which the risk of aggregation or thickening due to the processing liquid on the ejection surfaces of the second printing heads 103 can be significantly suppressed. In this case, very rarely, there still is a possibility that the printing medium is greatly deformed to the extent that it comes into contact with both the first printing head 102 and the second printing heads 103. In the present embodiment, an explanation is given of a configuration to deal with a case where the deformation amount occurring in the printing medium is so great that the suppressing effect cannot be achieved by the configuration of the first embodiment (for example, a case where the deformation amount d is greater than 2.0 mm), although its occurrence probability is low.

Figure 10:
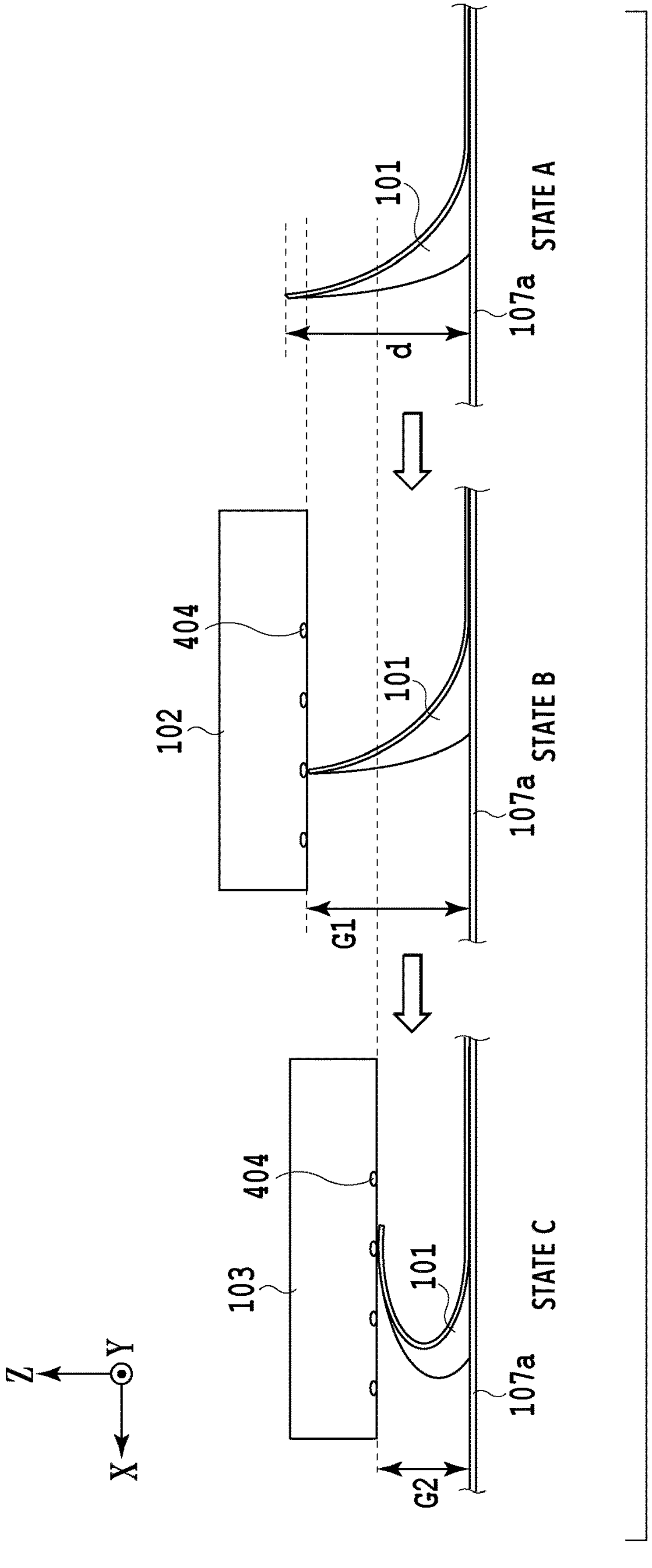
FIG. 10 is a diagram illustrating how the printing medium is conveyed below the printing heads.

FIG. 10 is a diagram illustrating how the printing medium 101 is conveyed below the printing heads in the printing unit 110 of the first embodiment. With reference to FIG. 10, an explanation is herein given of a situation in which the printing medium which is deformed by the deformation amount d greater than 2.0 mm is conveyed. State A in FIG. 10 illustrates how the printing medium 101, which is deformed more than the example explained in the first embodiment, is conveyed by the conveyor belt 107*a*. The deformation amount d here is 2.2 mm, and according to FIG. 7, the occurrence probability with respect to the total number of sheets conveyed is 0.0017%.

State B in FIG. 10 illustrates how the deformed printing medium 101 is conveyed below the first printing head 102. The distance G1 between the ejection surface of the first printing head 102 and the conveyor belt 107*a* is 2.0 mm, as explained in the first embodiment. At this time, the relationship between the deformation amount d of the printing medium and the distance G1 is G1<d. Therefore, the tip of the corner of the printing medium 101 comes into contact with the ejection surface of the first printing head 102. The situation is such that, onto the contact surface of the corner of the printing medium 101 that has made contact with the ejection surface of the first printing head 102, the processing liquid drawn out from the ejection ports 404 due to contact with the printing medium 101 has been transferred.

State C in FIG. 10 illustrates how the printing medium 101 onto which the processing liquid has been transferred as such is conveyed below the second printing head 103. The distance G2 between the second printing head 103 and the conveyor belt 107*a* is 1.0 mm, as explained in the first embodiment. In a case where the printing medium with the relatively great deformation amount of 2.2 mm is conveyed into the relatively narrow gap of 1.0 mm (G2<<d), the deformed corner comes into contact with the ejection surface of the second printing head 103. As described above, the printing medium 101 is fixed to the conveyor belt 107*a* except for the corner. For this reason, as illustrated in state C in FIG. 10, the printing medium 101 is deformed so as to fall significantly backward in the conveyance direction, such that the ejecting surface of the second printing head 103 and the corner of the printing medium 101 make wide surface contact. Since the processing liquid has been transferred to the contact surface of the printing medium 101, the processing liquid reacts with the ink components in the contact area, and thus aggregation or thickening occurs on the ejection surface of the second printing head 103. The aggregation or thickening that occurs at the ejection ports arranged in the contact area and in the vicinity thereof inhibits ink ejection performed by the second printing head 103, and as a result, non-ejection or ejection failure is incurred.

In this way, in the case of the configuration of the first embodiment, while the occurrence probability is low, if the deformation amount of the printing medium is great, non-ejection or ejection failure may occur.

Figure 11:
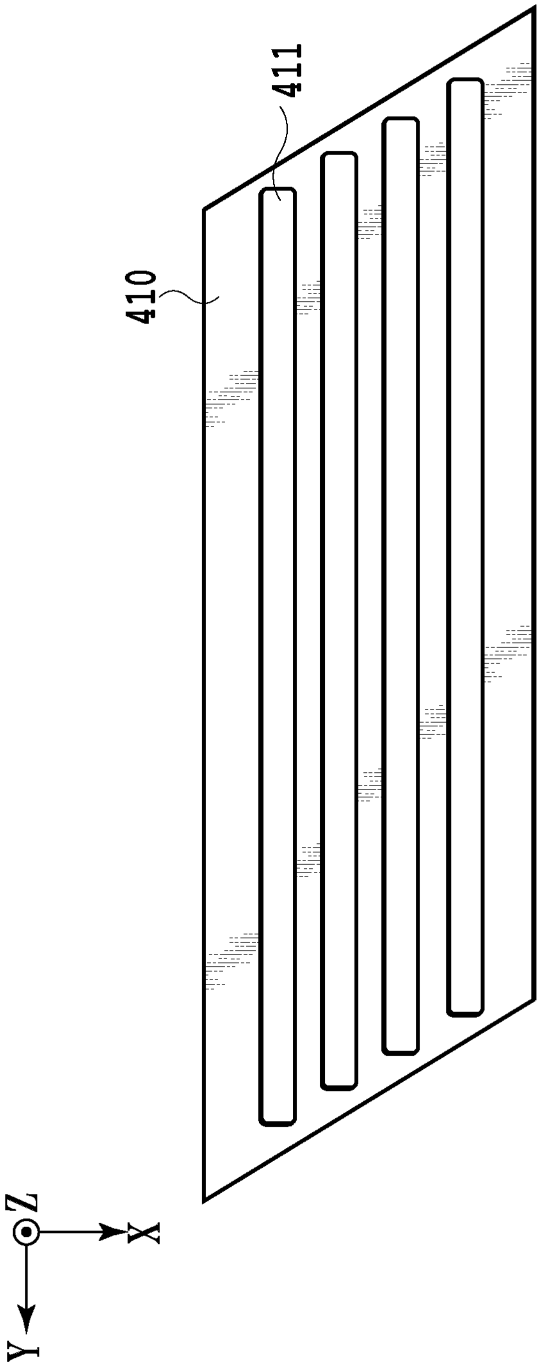
FIG. 11 is a diagram illustrating a guard member used in the printing heads.

FIG. 11 is a diagram illustrating the guard member 410 used in a printing head. The guard member 410 is a member that protects the printing element substrate 401 from physical damage caused by contact with the printing medium 101 or the like. FIG. 11 is a schematic view of the guard member 410 seen from the −Z direction. The guard member 410 is a plate-shaped member in which the openings 411 are disposed at the positions corresponding to the ejection port arrays formed on the ejection surface. The guard member 410 is bonded to the ejection surface, of the printing element substrate 401, on which the ejection ports are formed. The openings 411 have a width of about several hundred micrometers so as not to interfere with the ejection ports 404. The guard member 410 preferably has sufficient strength, and can have a thickness of about several tens of micrometers. Further, as the material of the guard member 410, for example, a metal material such as stainless steel or aluminum, silicon, alumina, or a resin material can preferably be used. The configuration of the guard member 410 is not limited to this. It is sufficient as long as there is a structure arranged so as to protrude below the ejection ports 404 formed on the ejection surface to reduce physical damage caused by contact with the printing medium 101 or the like. In this way, the guard member 410 is a plate-shaped member which has the openings 411 through which the ejection ports 404 are exposed.

In the present embodiment, an explanation is given of the example in which the guard member 410 as such is arranged in the second printing head 103. The difference between the printing unit 110 in the present embodiment and the printing unit 110 in the first embodiment explained with reference to FIG. 8 is that the guard member 410 is arranged on the ejection surface of the second printing head 103. The rest of the configuration is the same as those in the example explained in the first embodiment.

Figure 12:
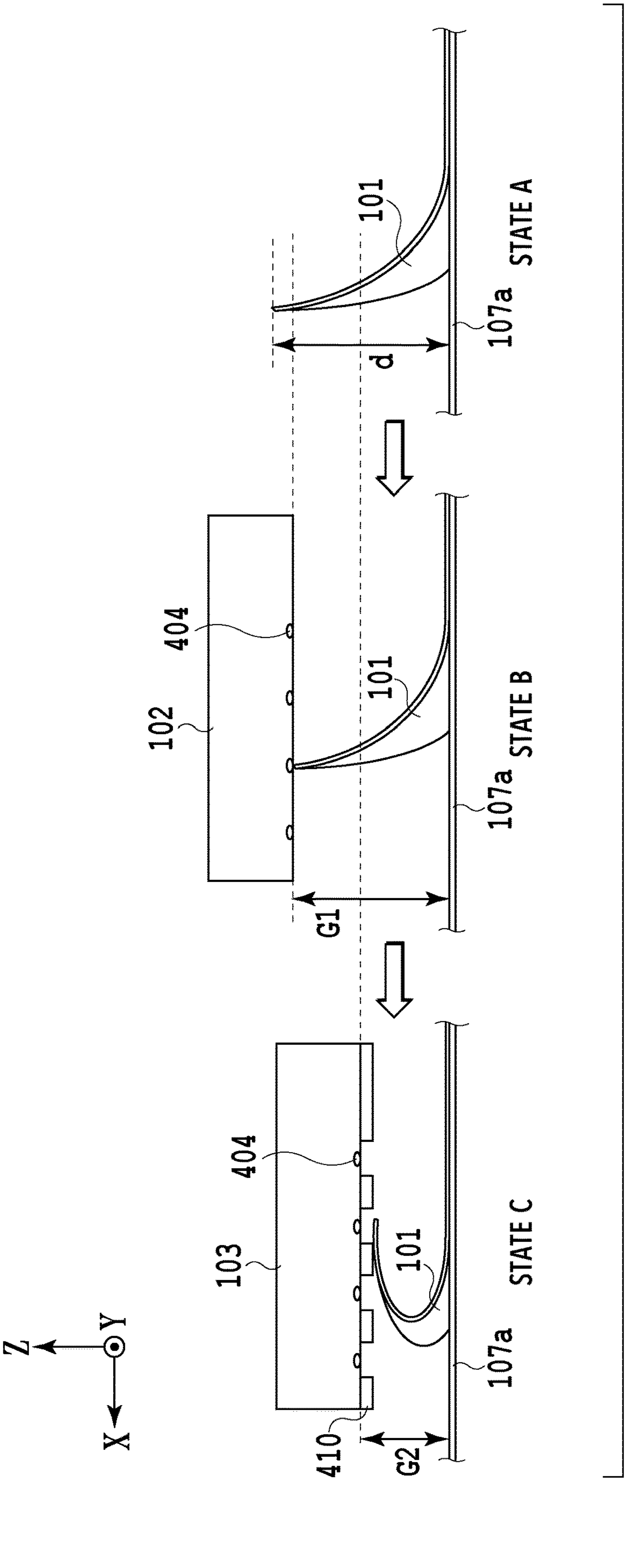
FIG. 12 is a diagram illustrating how the printing medium is conveyed below the printing heads.

FIG. 12 is a diagram illustrating how the printing medium 101 is conveyed below the printing heads. The difference from the example explained in FIG. 10 is whether or not the second printing head 103 is equipped with the guard member 410. Therefore, state A and state B in FIG. 12 are the same as state A and state B in FIG. 10, and thus the explanations thereof are omitted.

State C in FIG. 12 illustrates how the printing medium 101 that has made contact with the first printing head 102 is conveyed below the second printing head 103. The distance G2 between the second printing head 103 and the conveyor belt 107*a* is 1.0 mm, as explained in the first embodiment. The guard member 410, which has a shape opening at the ejection port array part, is bonded to the ejection surface of the second printing head 103 in the present embodiment. In a case where the printing medium 101 which has the relatively great deformation amount of 2.2 mm is conveyed into the relatively narrow gap of 1.0 mm (G2<<d), as illustrated in state C in FIG. 12, the printing medium 101 deforms greatly. That is, since the printing medium 101 is fixed to the conveyor belt 107*a* except for the corner, the printing medium 101 is deformed so as to fall significantly backward in the conveyance direction, as illustrated in state C in FIG. 12.

Here, the second printing head 103 in the present embodiment is equipped with the guard member 410 at a position protruding downward (in the −Z direction) from the ejection surface. Therefore, whereas the greatly deformed printing medium 101 comes into contact with the guard member 410 on the surface, the printing medium 101 to which the processing liquid has been transferred does not come into direct contact with the ejection surface and the ejection ports 404. That is, the guard member 410 can prevent the printing medium 101 to which the processing liquid has been transferred from coming into contact with the ejection ports 404.

As explained above, in the present embodiment, even in a case that very rarely occurs where the deformation amount of the printing medium 101 is great enough to come into contact with the ejection surface of the first printing head 102, it is possible to suppress the occurrence of aggregation or thickening. In the present embodiment, the example in which the guard member 410 is arranged on the second printing head 103 is explained. There may be a configuration in which the first printing head 102 is equipped with the guard member 410, or a configuration in which the first printing head 102 is not equipped with the guard member 410 as illustrated in FIG. 12, etc.

Third Embodiment

In the second embodiment, the example in which the second printing head 103 is equipped with the guard member 410 is explained on the basis of the configuration explained in the first embodiment. Furthermore, the explanation is given of the example in which, with such a configuration, even in a case that very rarely occurs where the printing medium 101 which is relatively greatly deformed comes into contact with an ejection surface, ink aggregation or thickening on the ejection surface can be suppressed.

In the present embodiment, an explanation is given where ink aggregation or thickening on the ejection surface due to the processing liquid transferred to the deformed printing medium 101 may still occur in a case of just providing the guard member 410. On that premise, a form in which the first printing head 102 is also equipped with the guard member 410 is explained.

Figure 13:
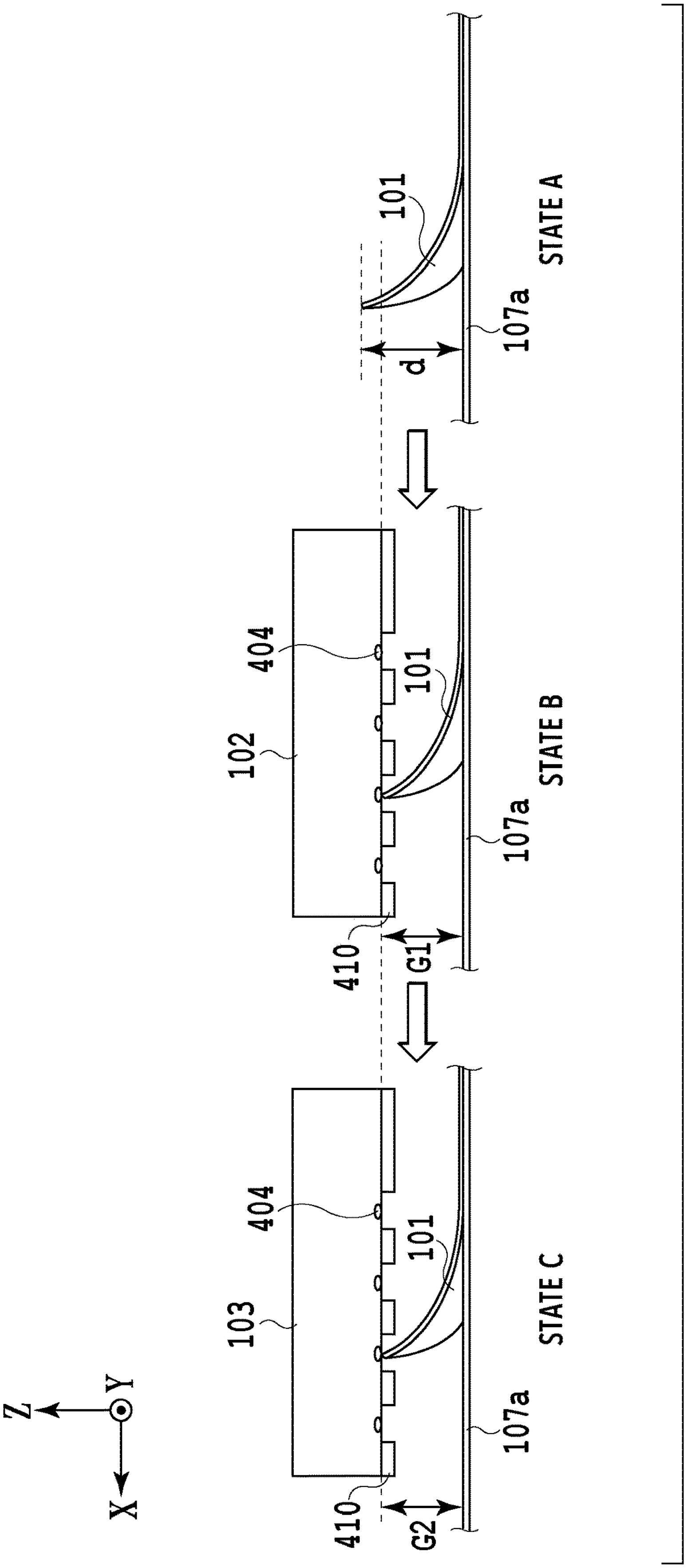
FIG. 13 is a diagram illustrating how the printing medium is conveyed below the printing heads.

FIG. 13 is a diagram illustrating how the printing medium 101 is conveyed below the printing heads. FIG. 13 is a diagram illustrating a comparative example of the present embodiment. That is, in FIG. 13, the example does not employ a configuration in which the distance G1 between the first printing head 102 which ejects the processing liquid and the conveyor belt 107*a* is larger than the distance G2 between the second printing head 103 and the conveyor belt 107*a*. On the other hand, the configuration is such that both the first printing head 102 and the second printing head 103 are equipped with the guard member 410.

As described above, in order to eject liquid from the ejection ports 404, openings are disposed in the guard member 410 at the ejection port array part of the ejection surface. These openings need to have a width of about several hundred micrometers to ensure the stability of liquid ejection. In the example of the present embodiment, the opening width is 300 μm. This is because, if the ejection port arrays and the openings are close to each other, there is a possibility that ejection is inhibited.

Since state A in FIG. 13 is the same state as state A in FIG. 6, the explanation thereof is omitted. State B and state C in FIG. 13 illustrate how the deformed printing medium 101 is conveyed to the first printing head 102 equipped with the guard member 410 and the second printing head 103 equipped with the guard member 410, respectively. As explained in the comparative example of the first embodiment, the distance G (G1 and G2) between the first printing head 102 and second printing head 103 and the conveyor belt 107*a* is 1.0 mm. Furthermore, since the deformation amount d of the printing medium is 1.2 mm, the corner of the printing medium comes into contact with the guard members 410 of the respective printing heads. The thickness of the printing medium is generally 50 μm to 500 μm. If the printing medium is thinner than the 300 μm opening width of the guard members 410, the corner of the printing medium 101 may get into the level difference between a guard member 410 and an ejection surface. At this time, the corner of the printing medium 101 comes into contact with the respective ejection surfaces of the first printing head 102 and the second printing head 103. Generally, thinner printing mediums tend to be more easily deformed, and the deformation amount tends to be greater. Therefore, the risk of aggregation or thickening of the processing liquid and ink on the ejection surfaces cannot be completely suppressed by using only the printing heads equipped with the guard members 410.

Figure 14:
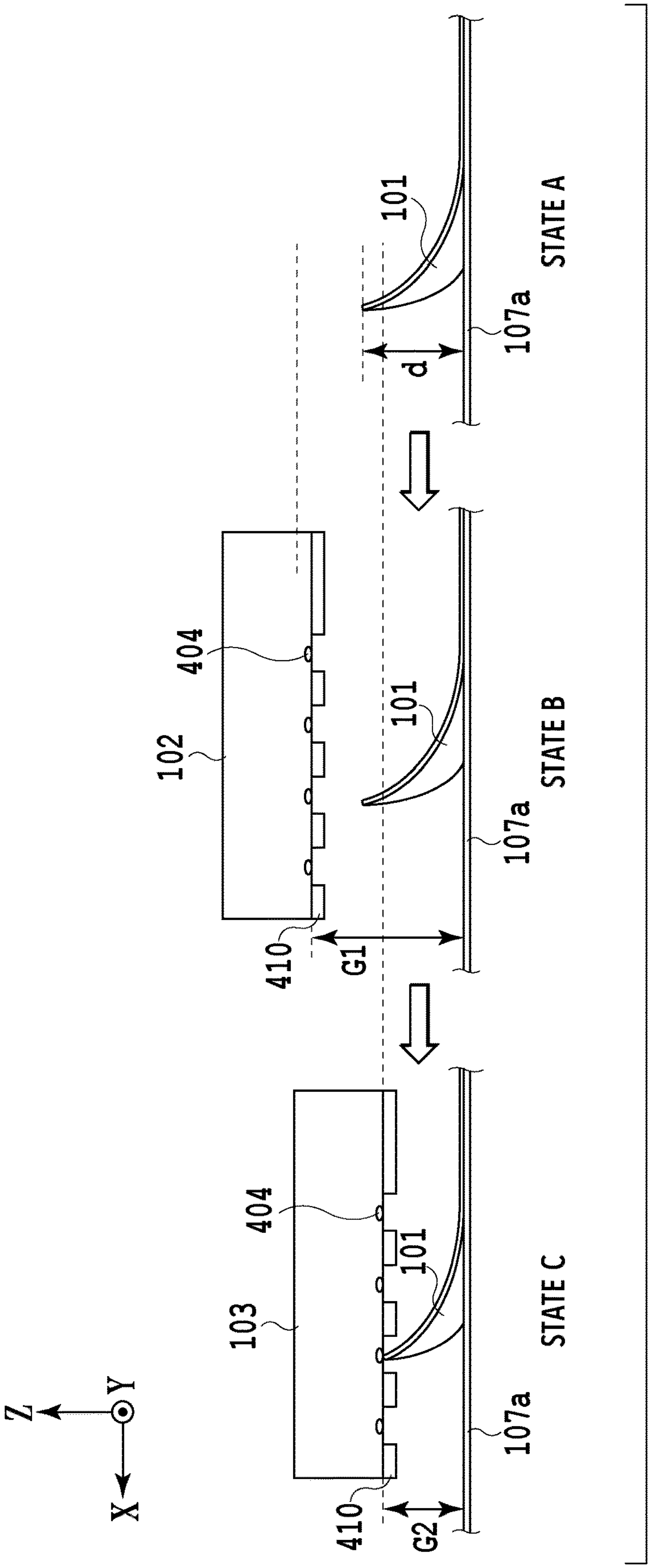
FIG. 14 is a diagram illustrating how the printing medium is conveyed below the printing heads.

FIG. 14 is a diagram illustrating how the printing medium 101 is conveyed below the printing heads. FIG. 14 is a diagram illustrating an example of the present embodiment. In the present embodiment, as in the first embodiment, the distance between the first printing head 102 and the conveyor belt 107*a* is configured to be larger than the distance between the second printing head 103 and the conveyor belt 107*a*. Further, the configuration is such that the guard member 410 is arranged on both the first printing head 102 and the second printing head 103. State A in FIG. 14 is the same as state A in FIG. 6 and FIG. 13.

State B in FIG. 14 illustrates how the deformed printing medium 101 is conveyed below the first printing head 102. The relationship between the distance between the ejection surface of the first printing head 102 and the printing medium 101 and the deformation amount d of the printing medium is G1>d. Therefore, the deformed printing medium 101 does not come into contact with the ejection surface of the first printing head 102.

State C in FIG. 14 illustrates how the deformed printing medium 101 is conveyed below the second printing head 103. The relationship between the distance between the ejection surface of the second printing head 103 and the printing medium 101 and the deformation amount d of the printing medium is G2<d. Therefore, the tip of the deformed printing medium 101 comes into contact with the guard member 410 of the second printing head 103. In this example, in a case of the printing medium 101 which has a thickness of less than 100 μm, the corner of the printing medium 101 gets into the level difference between the guard member 410 and the ejection surface, and the corner of the printing medium 101 comes into contact with the ejection surface. However, since the corner of the deformed printing medium 101 has avoided contact with the first printing head 102, the ink does not aggregate or thicken on the ejection surface of the second printing head 103.

As explained above, in the present embodiment, each ejection surface of the first printing head 102 and the second printing head 103 is configured to be equipped with the guard member 410. Further, the distance between the ejection surface of the first printing head 102 that ejects the processing liquid and the conveyor belt 107*a* is arranged to be larger than the distance between the ejection surface of the second printing head 103 that ejects another ink and the conveyor belt 107*a*. In this way, it is possible to suppress the occurrence of aggregation or thickening on the ejection surface due to contact between the processing liquid and the ink, which cannot be suppressed by simply providing the guard members 410.

Other Embodiments

In the embodiments described above, the explanations are given of the examples where each printing head is what is termed as a full-line type printing head in which ejection ports are disposed across the width direction of the printing medium. However, contact between the ejection surface of a printing head and a deformed printing medium can also occur with what is termed as a serial type printing head which performs printing while scanning. Similar effects can also be obtained in a form using a serial type printing head with the configurations explained in each of the above-described embodiments. In other words, the embodiments described above can also be applied to a serial type printing head. Further, application to an embodiment in which a line type printing head and a serial type printing head are used together is also possible.

Furthermore, in the embodiments described above, the explanation is given of the form in which the first printing head 102 that ejects the processing liquid is arranged on the upstream side in the conveyance direction relative to the second printing heads 103 that eject ink. That is, an example in which the processing liquid is used as what is termed as a primer (a priming liquid). However, limitation to this example is not intended. A form in which a coat/gloss liquid (an aftertreatment liquid) is used as the processing liquid is also possible. In a case of the form in which an aftertreatment liquid is used as the processing liquid, the first printing head 102 that ejects the processing liquid is arranged on the downstream side in the conveyance direction relative to the second printing heads 103 that eject ink. Even in a form as such, if the printing medium which has been deformed and to which ink has been transferred comes into contact with the ejection surface of the first printing head 102, the ejection of the first printing head 102 may not be performed properly due to a reaction resulting from the liquid contact. Further, as explained in the above-described embodiments, the landing accuracy of the first printing head 102 is not required to be as accurate as the landing accuracy of the second printing heads 103. Therefore, even in a case of the form in which an aftertreatment liquid is used as the processing liquid, the same configuration as in the above-described embodiments can be used. For example, as explained in the first embodiment, the height of the ejection surface of the first printing head 102 can be made higher than the height of the ejection surfaces of the second printing heads 103. Moreover, as explained in the second embodiment and the third embodiment, a guard member can also be arranged.

Furthermore, in the embodiments described above, an explanation is given of the difference in the height positions of the first printing head 102 and the second printing heads 103 in the printing position. The height positions in positions other than the printing position (for example, the standby position and the maintenance position) can be set at any given positions. That is, in positions other than the printing position, the height positions of the first printing head 102 and the second printing heads 103 may be at the same position, or may also be at positions maintaining the same height relationship as in the printing position. If, as in the explanation with reference to FIG. 4, the height positions of the first printing head 102 and the second printing heads 103 in the standby position are the same, the distances of movement from the standby position to the printing position differ. That is, the distance that the first printing head 102 moves from the standby position (the second position) to the printing position (the first position) is shorter than the distance that the second printing heads 103 move from the second position to the first position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025980, filed Feb. 22, 2023, which is hereby incorporated by reference herein in its entirety.

What is claimed is:

1. A printing apparatus comprising:

a conveyance unit configured to convey a printing medium in a conveyance direction;

a first printing head configured to eject a first liquid onto the printing medium being conveyed by the conveyance unit in a state where the first printing head is fixed in the printing apparatus such that a distance between a first ejection surface where ejection ports are formed and the printing medium corresponds to a first distance; and a plurality of second printing heads each configured to eject a second liquid, which reacts upon coming into contact with the first liquid, onto the printing medium being conveyed by the conveyance unit in a state where the second printing heads are fixed in the printing apparatus such that a distance between a second ejection surface where ejection ports are formed and the printing medium corresponds to a second distance smaller than the first distance, wherein the first printing head is provided upstream of the plurality of second printing heads in the conveyance direction.

2. The printing apparatus according to claim 1, wherein the first distance is larger than the second distance of any of the plurality of second printing heads.

3. The printing apparatus according to claim 1, wherein the second liquid is an ink for forming an image, and wherein the first liquid is a processing liquid that insolubilizes the ink upon coming into contact with the ink.

4. The printing apparatus according to claim 1, wherein the second ejection surface includes a guard member provided to be protruding relative to the ejection ports.

5. The printing apparatus according to claim 4, wherein the guard member includes an opening through which the ejection ports are exposed.

6. The printing apparatus according to claim 1, wherein the first ejection surface includes a guard member provided to be protruding relative to the ejection ports.

7. The printing apparatus according to claim 1, wherein a plurality of the ejection ports are arranged in a sheet width direction intersecting the conveyance direction on the first ejection surface of the first printing head, and wherein a plurality of the ejection ports are arranged in the sheet width direction on the second ejection surface of the second printing head.

8. A printing apparatus comprising:

a first printing head configured to eject a first liquid in a state where the first printing head is fixed in the printing apparatus; and a second printing head configured to eject a second liquid that reacts upon coming into contact with the first liquid in a state where the second printing head is fixed in the printing apparatus, wherein the first printing head and the second printing head are each configured to be movable to (1) a first position for ejecting liquid onto a printing medium being conveyed in a conveyance direction and (2) a second position for standing by without ejecting liquid, and wherein, in a direction perpendicular to an ejection surface on which an ejection port for ejecting liquid is formed, a distance the first printing head moves from the second position to the first position is different from a distance the second printing head moves from the second position to the first position.

9. The printing apparatus according to claim 8, wherein the second liquid is an ink for forming an image, and wherein the first liquid is a processing liquid that insolubilizes the ink upon coming into contact with the ink.

10. The printing apparatus according to claim 9, wherein the first printing head is provided upstream of the second printing head in the conveyance direction.

11. The printing apparatus according to claim 10, comprising a plurality of the second printing heads, wherein the first printing head is provided upstream of the plurality of the second printing heads in the conveyance direction.

12. The printing apparatus according to claim 9, wherein the first printing head is provided downstream of the second printing head in the conveyance direction.

13. The printing apparatus according to claim 12, comprising a plurality of the second printing heads, wherein the first printing head is provided downstream of the plurality of the second printing heads in the conveyance direction.

14. The printing apparatus according to claim 8, wherein a second ejection surface of the second printing head includes a guard member provided to be protruding relative to ejection ports of the second printing head.

15. The printing apparatus according to claim 14, wherein the guard member includes an opening through which the ejection ports are exposed.

16. The printing apparatus according to claim 8, wherein a first ejection surface of the first printing head includes a guard member provided to be protruding relative to ejection ports of the first printing head.

17. The printing apparatus according to claim 8, wherein a plurality of the ejection ports are arranged in a sheet width direction intersecting the conveyance direction on the first ejection surface of the first printing head, and wherein a plurality of the ejection ports are arranged in the sheet width direction on the second ejection surface of the second printing head.

18. A control method for a printing apparatus including (1) a first printing head for ejecting a first liquid in a state where the first printing head is fixed in the printing apparatus and (2) a second printing head for ejecting a second liquid that reacts upon coming into contact with the first liquid in a state where the second printing head is fixed in the printing apparatus, the control method comprising:

moving the first printing head, in a direction perpendicular to an ejection surface on which ejection ports for ejecting liquid are formed, a first distance towards a first position for ejecting liquid onto a printing medium being conveyed in a conveyance direction from a second position for standing by without ejecting liquid; and moving the second printing head, in a direction perpendicular to an ejection surface on which ejection ports are formed, a second distance, which is different from the first distance, towards a first position for ejecting liquid onto a printing medium being conveyed in the conveyance direction from a second position for standing by without ejecting liquid.

19. The control method according to claim 16, wherein the first liquid is ejected from a plurality of ejection ports arranged in a sheet width direction intersecting the conveyance direction on the first printing head, and wherein the second liquid is ejected from a plurality of ejection ports arranged in the sheet width direction on the second printing head.

* * * * *